United States Patent
Wierzba et al.

[19]

[11] Patent Number: 6,082,151
[45] Date of Patent: Jul. 4, 2000

[54] BALANCING DEVICE FOR USE ON WASHING MACHINES

[75] Inventors: Paul Wierzba; Weijia Cao, both of Calgary, Canada

[73] Assignee: ETI Technologies, Inc., St. Peter Port, United Kingdom

[21] Appl. No.: 09/138,362

[22] Filed: Aug. 21, 1998

[51] Int. Cl.[7] .................................................. D06F 37/24
[52] U.S. Cl. ........................................ 68/23.2; 74/573 F
[58] Field of Search ........................... 68/23.2; 74/573 F, 74/573 R

[56] References Cited

U.S. PATENT DOCUMENTS

| | | | |
|---|---|---|---|
| 5,460,017 | 10/1995 | Taylor | 68/23.2 |
| 5,746,069 | 5/1998 | Kim | 68/23.2 |
| 5,782,110 | 7/1998 | Kim | 68/23.2 X |
| 5,806,349 | 9/1998 | Kim et al. | 68/23.2 |
| 5,857,360 | 1/1999 | Kim et al. | 68/23.2 |

FOREIGN PATENT DOCUMENTS

| | | | |
|---|---|---|---|
| 52-087581 | 7/1977 | Japan . | |
| 140064 | 10/1979 | Japan | 68/23.2 |
| 59-183846 | 10/1984 | Japan . | |
| 16678 | 4/1987 | Japan | 68/23.2 |
| 1195203 | 11/1985 | U.S.S.R. | 74/573 R |
| 1732205 | 5/1992 | U.S.S.R. | 74/543 F |

*Primary Examiner*—Philip R. Coe
*Attorney, Agent, or Firm*—Burns Doane Swecker and Mathis, LLP

[57] ABSTRACT

A speed dependent response control balancing device of the present invention provides control of vibrations in a rotatable member such as a rotatable basket of a washing machine. The balancing device has two compartments including an annular ball race and a reservoir. A plurality of balls are positioned within the annular ball race and move within the ball race to counteract the imbalance of the basket. A varying amount of viscous fluid is delivered from the reservoir into the ball race depending on a rotational speed of the balancing device. Accordingly, the reaction or "quickness" of the response of the balls within the ball race changes with the rotational speed of the balancing device to provide quick response during a start-up period and slower response at high rotational speeds.

12 Claims, 12 Drawing Sheets

(6 of 12 Drawing Sheet(s) Filed in Color)

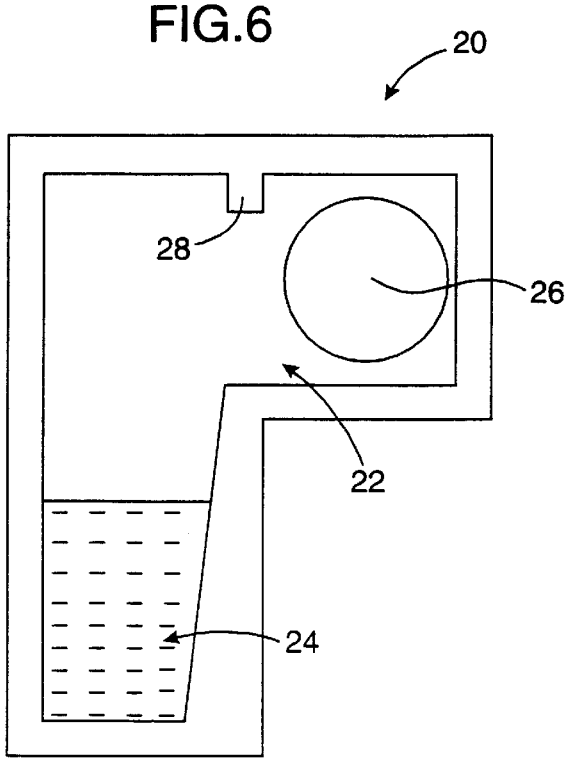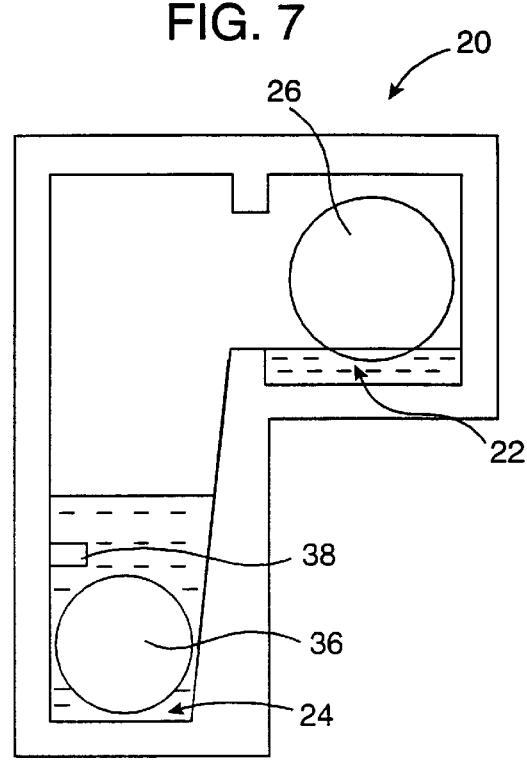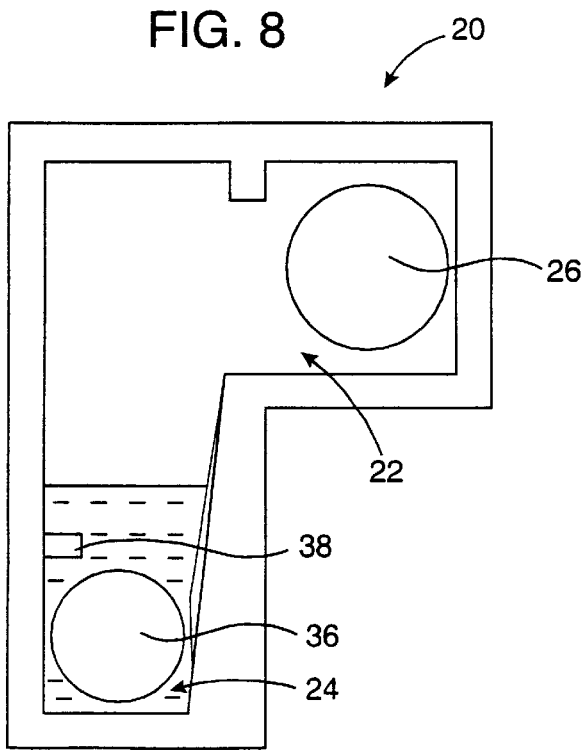

6,082,151

BALANCING DEVICE FOR USE ON WASHING MACHINES

BACKGROUND OF THE INVENTION

1. Field of the Invention

The invention relates to a balancing device for a washing machine, and more particularly, the invention relates to a speed dependant response control balancing device to prevent vibration of a rotating basket in a washing machine.

2. Brief Description of the Related Art

Vertical axis washing machines often go out of balance at the start of rotation of the basket and at high rotational speeds due to an uneven distribution of the load in the washing machine basket. The effect of the imbalance at high rotational speeds causing undesirable vibration may cause damage to the motor, cause the basket to bump violently against the outer shell of the washing machine, and even cause the washing machine to "walk" across the floor.

To address both the start up imbalance and the associated high speed vibrations, manufacturers have used combinations of balancers and suspensions to isolate the basket from the rest of the machine. These devices have provided varying degrees of success in solving the washing machine balance problems.

Known balancers for balancing a rotating body include one or more annular grooves or races and a plurality of balls or rollers which move along the races to counteract the imbalance forces. The races may contain a fluid for damping the motion of the balls. The problem with these known balancers is that they cannot adjust for both of the underlying conditions which cause imbalanced operation. In particular, upon acceleration of the basket at low speeds, the balls inside the balancer must be free to move and able to react quickly to balance the basket as the machine accelerates to an operating speed without causing excessive startup vibration. At higher speeds, the balancer must be able to "set up," or in other words, the balls should remain relatively immobile, in order to provide balanced operation as the machine passes through the rocking mode and at the steady state above the rocking mode.

Accordingly, it would be desirable to provide a speed dependant design for a balancing device which reacts differently depending on the rotational speed of the rotating object.

It would also be desirable to provide a balancing device which adjusts for both start up vibration and instability caused by an imbalanced load at higher speeds.

SUMMARY OF THE INVENTION

The present invention relates to a balancing device for a washing machine which reacts differently depending on the rotational speed of the balancing device. The balancing device reacts quickly at low speeds and "sets up" at high speeds.

In accordance with one aspect of the present invention, a washing machine with a balancing device includes a rotatable basket having an axis of rotation, at least one circumferential passageway positioned on the rotatable basket with an axis of rotation of the circumferential passageway coincident with the axis of rotation of the basket, a liquid reservoir containing a fluid, a plurality of weights movable in the circumferential passageway, a fluid connection between the liquid reservoir and the circumferential passageway allowing fluid to pass between the liquid reservoir and the circumferential passageway depending on the rotational velocity of the basket.

In accordance with an additional aspect of the present invention, a speed dependant balancing device includes at least one circumferential passageway, a plurality of weights movable in the circumferential passageway, a fluid within the circumferential passageway, and means for controlling a volume of fluid in the circumferential passageway depending on a rotational velocity of the balancing device.

In accordance with a further aspect of the invention, a speed dependant balancing device for a washing machine includes a circumferential path having a rotational axis which is coincident with a rotational axis of a washing machine basket, a plurality of weights movable in the circumferential path, and a friction controlling means for controlling the speed of motion of the plurality of weights in the circumferential path depending on a rotational velocity of the circumferential path and the washing machine basket.

The present invention provides advantages of a balancing device which adjusts for both start-up vibration and vibration at high speeds due to an unbalanced load.

BRIEF DESCRIPTION OF THE DRAWINGS

The file of this patent contains drawings executed in color. Copies of this patent with color drawings will be provided by the Patent and Trademark Office upon request and payment of the necessary fee.

The invention will now be described in greater detail with reference to the preferred embodiments illustrated in the accompanying drawings, in which like elements bear like reference numerals, and wherein:

FIG. 6 is a cross sectional view of a second embodiment of a balancing device;

FIG. 7 is a cross sectional view of a third embodiment of a balancing device;

FIG. 8 is a cross sectional view of a fourth embodiment of a balancing device;

DETAILED DESCRIPTION OF THE PREFERRED EMBODIMENTS

Figure 1:
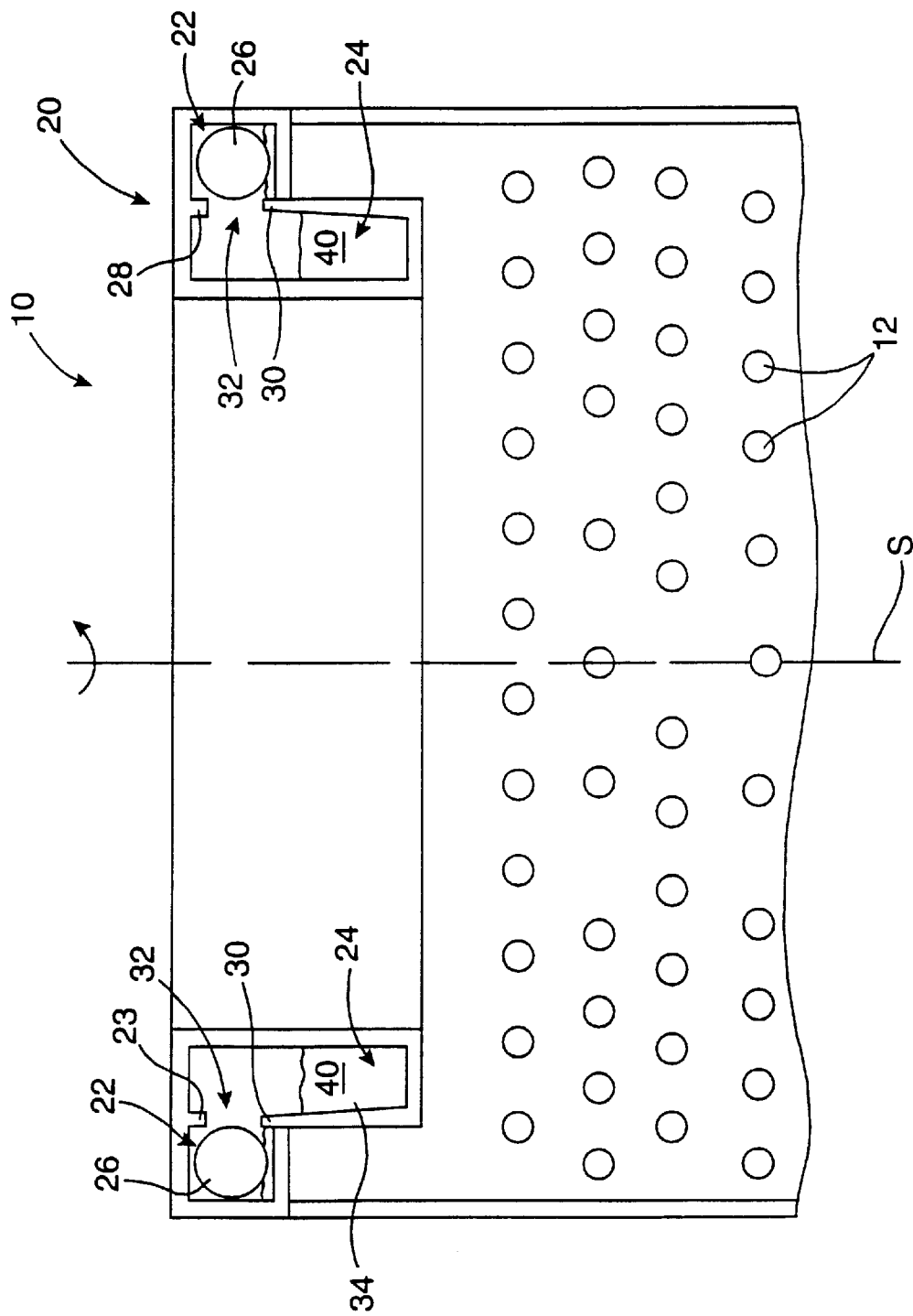
FIG. 1 is a cross sectional view of an upper portion of a washing machine basket having a balancing device mounted thereon.

Washing machines generally include an outer cylindrical water retaining chamber, a rotatable basket within the outer chamber, and an agitator or pulsator within the basket. FIG. 1 illustrates an upper portion of a rotatable washing machine basket 10 having a plurality of perforations 12 allowing water to drain out of the basket. An annular balancing device 20 according to the present invention is illustrated in FIG. 1 to be mounted at a top edge of the basket 10 and positioned such that an axis of rotation of the balancing device coincides with a spin axis S of the basket. The balancing device 20 provides speed dependant response control of vibrations.

The balancing device 20 according to the present invention is particularly advantageous for achieving balancing of baskets in top loading washing machines. However, it should be understood that the balancing device 20 can be used with other types of washing machines and other rotating systems with vertical spin axes, such as centrifuges.

The balancing device 20 according to the embodiment of FIGS. 1–5 has two compartments including a first compartment called a ball race 22 and a second compartment referred to as a reservoir 24. The ball race 22 is positioned slightly above and to the outside of the reservoir 24. The reservoir 24 is designed to hold an appropriate volume of a fluid 40 to fill up the ball race 22 when the balancing device 20 is rotated. A plurality of balls 26 are positioned within the annular ball race 22 and move within the ball race to counteract the imbalance of the basket 10. The speed dependant response control of the balancing device 20 is provided by varying the amount of viscous fluid 40 within the ball race 22 depending on a rotational velocity of the balancing device.

The fluid 40 within the balancing device 20 may be any viscous fluid such as silicone oil, mineral oil, other oils, saltwater, water based fluid with polymers to increase viscosity, or the like.

The ball race 22 includes upper and lower stops 28, 30 or annular ridges which retain the balls 26 in the ball race. An opening 32 is provided between the upper and lower stops 28, 30 which allows the fluid to pass between the two chambers. Alternatively, the single annular opening 32 may be replaced by a plurality of openings without departing from the present invention. The balls 26 preferably fit within the ball race 22 with a minimum clearance which allows the balls to move freely when the fluid is absent from the ball race.

The reservoir 24 has an inclined outer wall 34 forming an angle β with the horizontal. As the balancing device 20 is rotated, centrifugal force forces the balls 26 and the fluid 40 to an outer wall of each compartment. When the centrifugal force is large enough, the fluid 40 in the reservoir 24 is pushed up the inclined wall 34, over the lower stop 30, and into the ball race 22. As the rotational velocity of the balancing device 20 increases further, the fluid 40 continues to pass into the ball race 22 until the race is completely filled or all the fluid has passed out of the reservoir.

As the fluid moves between the reservoir 24 and the ball race 22 the amount of dampening on the balls 26 varies. When the ball race 22 is filled with the viscous fluid 40 the amount of dampening on the motion of the balls 26 is large. When the rotational velocity of the balancing device 20 decreases and the fluid 40 passes back into the reservoir 24 the amount of dampening on the balls decreases. Accordingly, the reaction or "quickness" of response of the balls 26 changes with the rotational speed of the balancing device 20.

For example, at low speeds, when little or no fluid 40 is in the ball race 22, the balls 26 will react quickly. This is advantageous in the start-up period when the basket 10 is rotating at low speeds and accelerating and quick response is desirable. The damping of the balls 26 is increased at high rotational velocities when the balls are covered by the fluid 40. This increased damping is desirable for balancing of imbalanced loads in the basket at higher speeds.

As the spin basket 10 accelerates during start-up it is advantageous to have the balls 26 lag behind the imbalance as opposed to having the balls positioning themselves with the imbalance. This will prevent the balls from adding to the existing imbalance and provide much smother start-up vibration. The balls 26 are caused to lag behind the imbalance by having relatively low damping on the balls at start-up. In some systems it may be desirable to have almost zero damping on the balls. The height of the lower stop 30 determines the amount of fluid remaining in the ball race 22 at low speeds and thus, the amount of damping at start-up.

The balls 26 should lag behind the imbalance until the basket 10 passes the so-called cylindrical critical speed $\omega_1$ which is typically about 60 to 70 rpm. Above the critical speed $\omega_1$ the balancing device will begin to compensate for the imbalanced load in the basket 10 and the machine will operate in a generally balanced fashion. Between the critical speed $\omega_1$ and a rocking critical speed $\omega_2$ the machine is in a stable operating range where vibration is minimal and the ball race 22 begins to fill with fluid.

As the machine accelerates to the rocking mode, it is advantageous to immobilize the balls 26 as much as possible because the balls themselves can generate a rocking mode force (excitation) by moving out of a balanced position. The ball immobilization is accomplished by allowing all the fluid from the reservoir 24 to travel into the ball race 22 before the rocking mode is entered (at speed $\omega_2$). Above the rocking mode critical speed $\omega_2$ stable balanced operation occurs due to the high damping provided by the fluid 40 in the ball race 22.

The amount of fluid 40, the angle of the inclined wall 34 of the reservoir 24, the viscosity of the fluid, and the capacity of the unit may all be varied to meet the balancing requirements of a particular system. In addition, the positioning of the balancing device 20 on the washing machine basket 10 may be varied. According to the embodiment of FIG. 1, the balancing device 20 fits inside of the top of the washing machine basket 10. The balancing device 20 may also be positioned on the outside of the basket, at the bottom of the basket, or multiple balancing devices may be used at the top, bottom, and/or middle of the basket.

Figure 2:
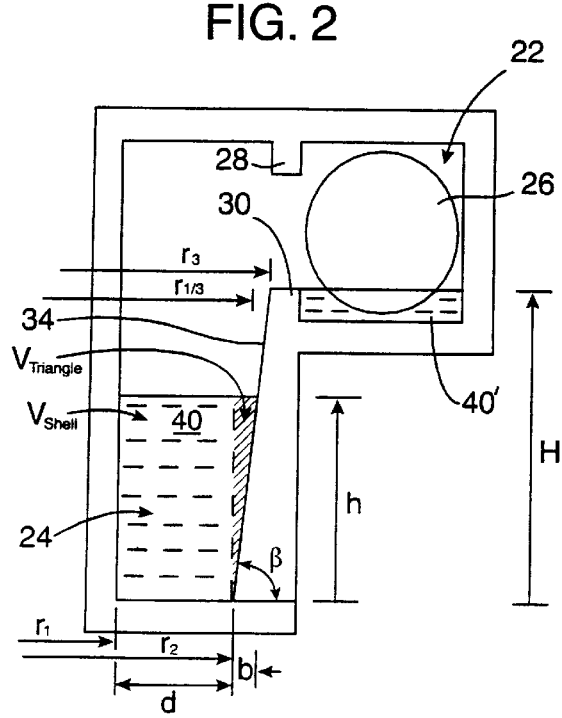
FIG. 2 is a cross sectional view of a balancing device according to a first embodiment of the invention with the balancing device at rest.
Figure 3:
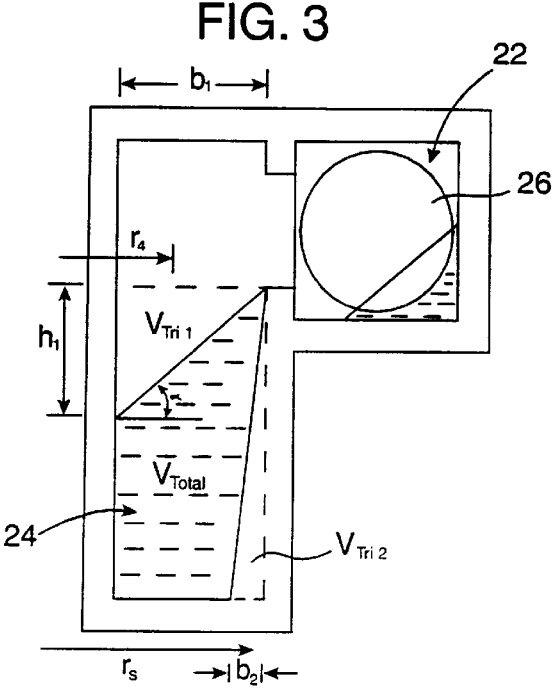
FIG. 3 is a cross sectional view of the balancing device of FIG. 2 rotating at a first speed.
Figure 4:
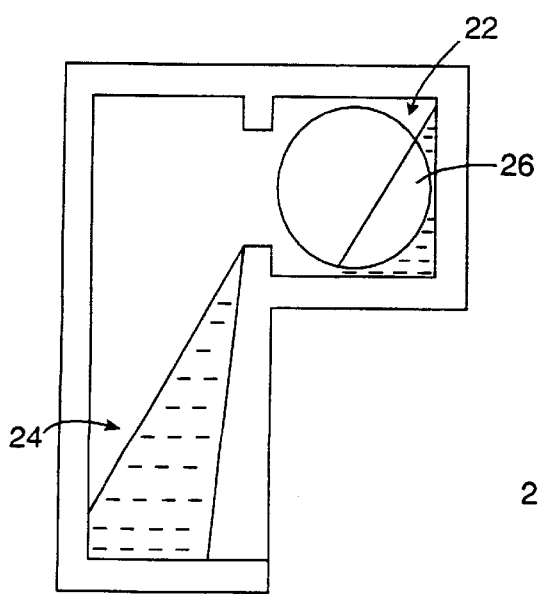
FIG. 4 is a cross sectional view of the balancing device of FIG. 2 rotating at a second speed.
Figure 5:
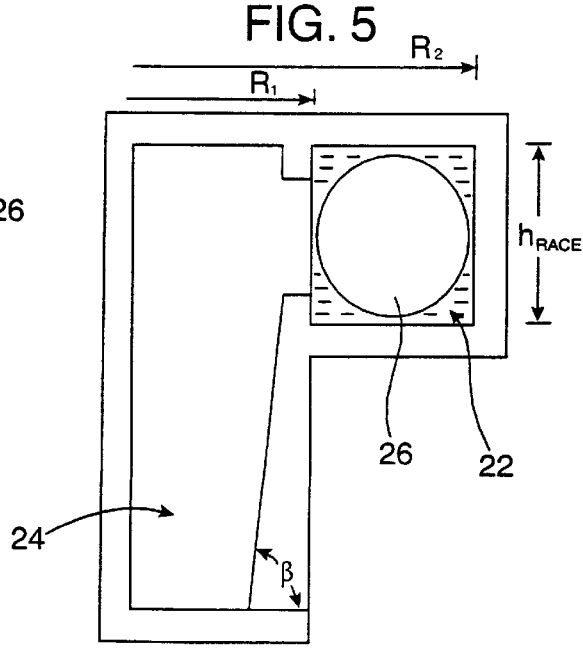
FIG. 5 is a cross sectional view of the balancing device of FIG. 2 rotating at a third speed.

FIGS. 2–5 illustrate a cross section of a balancing device 20 at different rotational speeds and the location of the fluid 40 within the balancing device. FIG. 2 illustrates a balancing device 10 which is not rotating or is rotating at a low speed at which the fluid 40 is located mainly in the reservoir 24 with a small residual amount of fluid 40' in the ball race 22. In FIG. 3, the rotational speed of the balancing device 20 has increased to a critical speed $\omega_1$ such that an angle $\alpha$ of the surface of the fluid 40 with respect to the horizontal allows fluid to begin to pass into the ball race 22. FIG. 4 illustrates a balancing device 20 at a rotational speed which is higher than $\omega_1$ but not so high that all of the fluid has passed into the ball race 22. Finally, FIG. 5 illustrates the balancing device 20 which is rotated at a rotational speed $\omega_2$ at which substantially all of the fluid 40 has passed out of the reservoir 24 and into the ball race 22 due to centrifugal force.

The following is a description of how the size and shape of the balancing device 20 may be determined based on the requirements for a particular washing machine.

Assuming that the location and the size of the ball race 22 are known, (this information most likely comes from the dimensions of the washing machine and the balancer's capacity requirements), the basic dimensions for the reservoir can be calculated.

The first step is to determine the desired rotational speeds for when the fluid 40 first enters the ball race 22 ($\omega_1$) and for when the race is full ($\omega_2$). This range of rotational speeds is important as it will determine the dimensions of the reservoir 24 and the slope of the inclined reservoir wall 34. These values will depend on the highest rotational speed, the critical speed, and how quickly the race needs to be filled. In the following $\omega_1$ will represent rotational transitional speed when the fluid first enters the ball race 22, while $\omega_2$ will represent the transitional rotational speed when the race is full.

The second step is to determine the volume needed to fill the ball race 22. Assuming the balls travels in a cylindrical shell the formula:

$$V_{Race} = \pi h_{Race}(R_2^2 - R_1^2)$$

can be used. Here $V_{Race}$ represents the total volume of the ball race 22 which is illustrated filled with fluid in FIG. 5, $h_{Race}$ represents the height of the desired race, $R_2$ represents the outer radius of the shell, and $R_1$ represents the inner radius of the shell.

The next step is to calculate the volume of the race 22 that the balls 26 will take up, as the balls themselves will replace some of the fluid. Since:

$$V_{Balls} 32\ n(4/3\pi r^3)$$

and $$V_{Liquid} = V_{Race} - V_{Balls}$$

where r is the radius of the balls and n the number of balls in the race. The volume of liquid needed in the reservoir, $V_{Liquid}$ can now be calculated.

Next it is necessary to calculate the angles $\alpha$ the fluid will attain at both the transitional rotational speeds $\omega_1$ and $\omega_2$ with respect to the horizontal. $\alpha$ will represent the low speed angle and $\beta$ will represent the high speed angle shown in FIG. 5 where the ball race is completely filled. The angle $\beta$ is the same as the angle of inclined wall 34 of the reservoir 24.

Since the width of the race is small as compared to the mean radius i.e.:

$$\frac{R_1 + R_2}{2} \gg R_1 - R_2$$

the liquid level, can be assumed to be along a straight line at any speed. The angles $\alpha$ and $\beta$ can be approximately determined by using the following equations:

$$\beta = \arctan(\omega_2^2 \overline{R}/g)$$

$$\alpha = \arctan(\omega_1^2 \overline{R}/g)$$

here $\omega$ represents the angular speed in rad/s, R the mean radius of rotation and g the acceleration due to gravity. Ideally, the outer wall of the reservoir will be at the angle $\beta$ so that all the fluid will be forced up the wall into the race at the high rotation speed $\omega_2$. At this point the actual dimensions of the reservoir must be calculated. Approximating the volume of the reservoir as a combination of a triangular and rectangular volumes of revolutions equations can be set up to determine the approximate dimensions.

Knowing:

$$V_{Triangle} \approx \pi b h r_{1/3}$$

where $$r_{1/3} = r_2 + \tfrac{1}{3}b$$

and $$V_{Shell} = \pi h(r_2^2 - r_1^2)$$

where two of h (fluid level), $r_2$, or $r_1$ are values that must be dictated by the allowable dimensions of the balancer or just preset at a given value. These dimensions are illustrated in FIG. 2 with the radius $r_1$, $r_2$, $r_{1/3}$, $r_3$ and measured from the spin axis. The above equations will result in the following:

$$V_{Total} \approx V_{Triangle} + V_{Shell}$$

$$V_{Total} \approx \pi b h r_{1/3} + \pi h(r_1^2 - r_1^2)$$

and with the following geometric relationships:

$$r_1 = r_2 - d$$

$$b = h/\tan \beta$$

$$r_{1/3} = r_2 + \tfrac{1}{3} * h/\tan \beta$$

Therefore:

$$V_{Total} \approx \pi * h \left[ \frac{h * r_2}{\tan \beta} + \frac{h^2}{3\tan^2 \beta} + 2r_2 * d - d^2 \right]$$

Solve for d or h to get the width or height of the reservoir respectively.

At this point the only other dimension needed is H. H defines the distance between the bottom of the reservoir and the top of the lower stop 30 which divides the race 22 and the reservoir 24. H is set to prevent any liquid from entering the race 22 below the low rotational speed $\omega_1$. To determine the height H, the fact that all the liquid must remain in the reservoir at $\omega_1$ is considered.

$V_{Total}$ remaining in the reservoir 24 at $\omega_1$ when the fluid surface is at angle $\alpha$, as shown in FIG. 3, is determined by the following relationship.

$$V_{Total} = V_{Shell} - V_{Tri\ 1} - V_{Tri\ 2}$$

Using the appropriate volumes of revolution:

$$V_{Total} = \pi H(r_3^2 - r_1^2) - 2\pi r_4(\tfrac{1}{2}b_1 h_1) - 2\pi r_5(\tfrac{1}{2}b_2 h_2)$$

where $b_1$, $h_1$, $b_2$, $h_2$ are the respective base and height measurements of each triangular volume $V_{Tri\ 1}$ and $V_{Tri\ 2}$.

$$r_4 = r_3 - 2/3b_1 \qquad r_5 = r_3 - H/3\tan\beta$$
$$r_5 = r_2 + 2/3b_2 \qquad r_4 = r_1 + 1/3b_1$$
$$b_1 = r_3 - r_1 \qquad h_1 = b_1 \tan\alpha$$
$$b_2 = H/\tan\beta \qquad h_2 = H$$
$$r_3 = r_2 + H/\tan\beta \qquad r_1 = r_3 - H/\tan\beta - d$$

Hence:

$$V_{Total} = \pi H\left[\left(r_2 + \frac{H}{\tan\beta}\right)^2 - (r_2 - d)^2\right] -$$
$$\pi * \tan\alpha\left[\left(d + \frac{H}{\tan\beta}\right)^2\left(r_2 + \frac{H}{3\tan\beta} - 2/3d\right)\right] - \pi\left[r_2 + \frac{2H}{3\tan\beta}\right]H^2/\tan\beta$$

Now that h, H and d have been determined the reservoir can be manufactured.

There are a few other calculations which may provide useful when analyzing the speed dependant control system. The first of these is the calculation of the fluid angle at various rotational speeds. From this, the volume of the fluid in the reservoir as a function of rotational speed can be calculated using equations similar to those for calculating H. This calculation in return, will give vital information on how quickly the ball race 22 fills up while going through the critical zone and hence how effective the actual balancer will be during operation.

FIG. 6 shows an alternative embodiment of the invention in which the balancing device 20 includes a reservoir 24 and a ball race 22 containing a plurality of balls 26. The balls 26 are retained within the ball race 22 by an upper stop 28 and the lower stop is omitted. In this embodiment, when the balancing device 20 is stationary or rotating at a speed less than $\omega_1$ the ball race contains substantially no fluid allowing the balls 26 to move with near zero damping.

A further alternative embodiment of the invention is illustrated in FIG. 7 in which the balancing device 20 includes a second plurality of balls 36 positioned in the reservoir 24. The first set of balls 26 are referred to as the primary masses and possess most of the compensating capacity. The second set of balls 36 are referred to as the secondary or trim balancing masses. The second set of balls 36 are restrained in the reservoir 24 even at high speeds when all the fluid passes into the ball race 22 by the use of an annular reservoir stop 38 positioned on an interior wall of the reservoir.

The advantage of the embodiment of FIG. 7 is that at high rotational speeds above the rocking mode critical speed $\omega_2$ the secondary masses will be subject to no damping because all the fluid will be located in the ball race 22. Thus, the secondary masses 36 will be free to move within the reservoir 24 to remove any residual out of balance condition left by the primary masses 26. This will result in improved residual vibrational levels at steady state operating speeds.

FIG. 8 illustrates a further alternative embodiment of a balancing device 20 including the secondary masses or second set of balls 36 as well as a nearly zero initial damping on the primary masses or first set of balls 26 due to omission of the lower stop.

Figure 9:
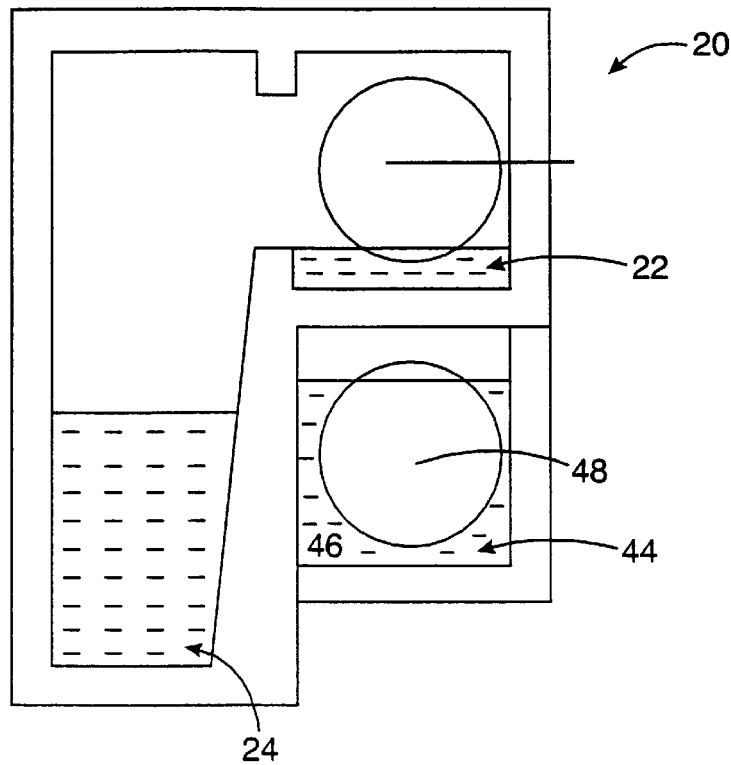
FIG. 9 is a cross sectional view of a fifth embodiment of a balancing device.

A balancing device 20 as shown in FIG. 9 includes a fixed response secondary ball race 44 positioned beneath the primary ball race 22. The secondary ball race 44 is entirely contained and separate from the primary ball race 22. A fluid 46 and a plurality of secondary fixed response masses 48 are located in the secondary ball race 44. The embodiment of FIG. 9 provides the advantage of better start-up vibration than the embodiment of FIGS. 1–5 due to the fixed response secondary ball race 44 and masses 48. This improvement occurs because the balls in each race 22, 44 can be differentiated in terms of position on start-up providing a more stable start-up. The amount and viscosity of the fluid 46, and the weight and number of the balls 48 in the secondary ball race 44, and the size and position of the secondary ball race may be varied to fine tune the balancing device 20.

Figure 10:
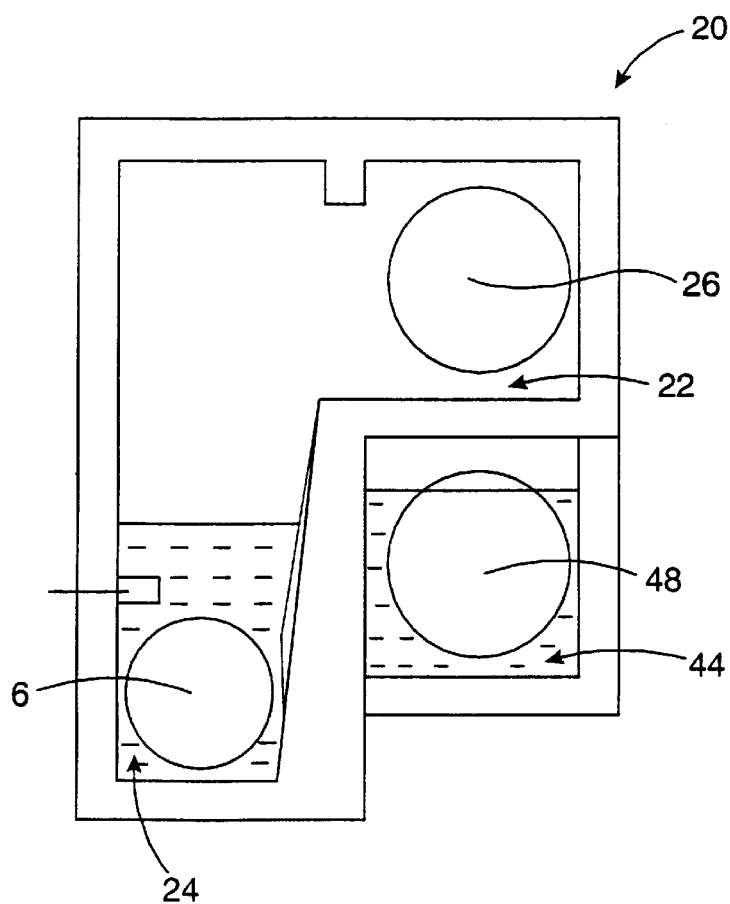
FIG. 10 is a cross sectional view of a sixth embodiment of a balancing device.

FIG. 10 illustrates another embodiment of a balancing device 20 combining the advantageous features of the embodiments of FIGS. 8 and 9. This embodiment includes three sets of compensating masses, primary 26, secondary 36, and tertiary masses 48. The primary and secondary masses 26, 36 have speed dependant variable responses while the tertiary masses 48 have a fixed response. Accordingly, the system provides the advantages of low start-up vibration, good rocking mode stability, and improved residual vibration levels at the steady-state operating speed.

Figure 11:
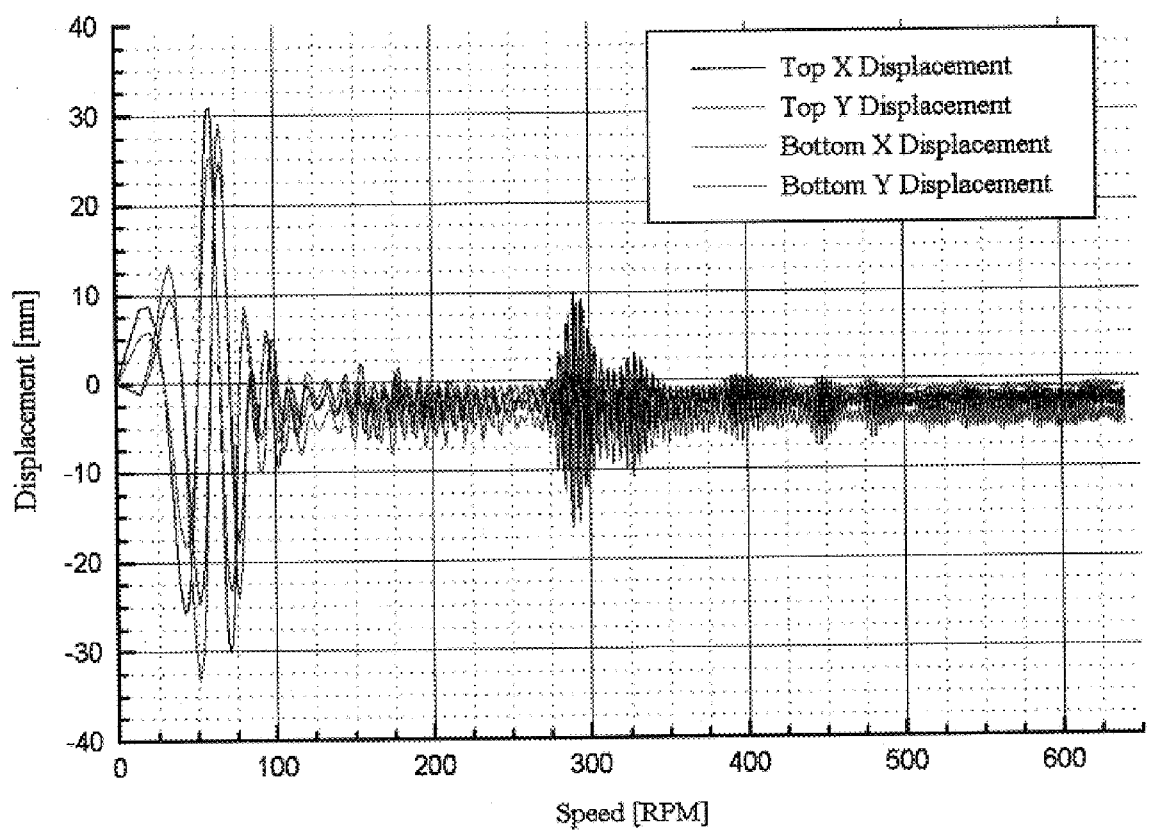
FIG. 11 is a graph of the displacement of a basket having prior art balancing devices at the top and bottom of the basket.
Figure 12:
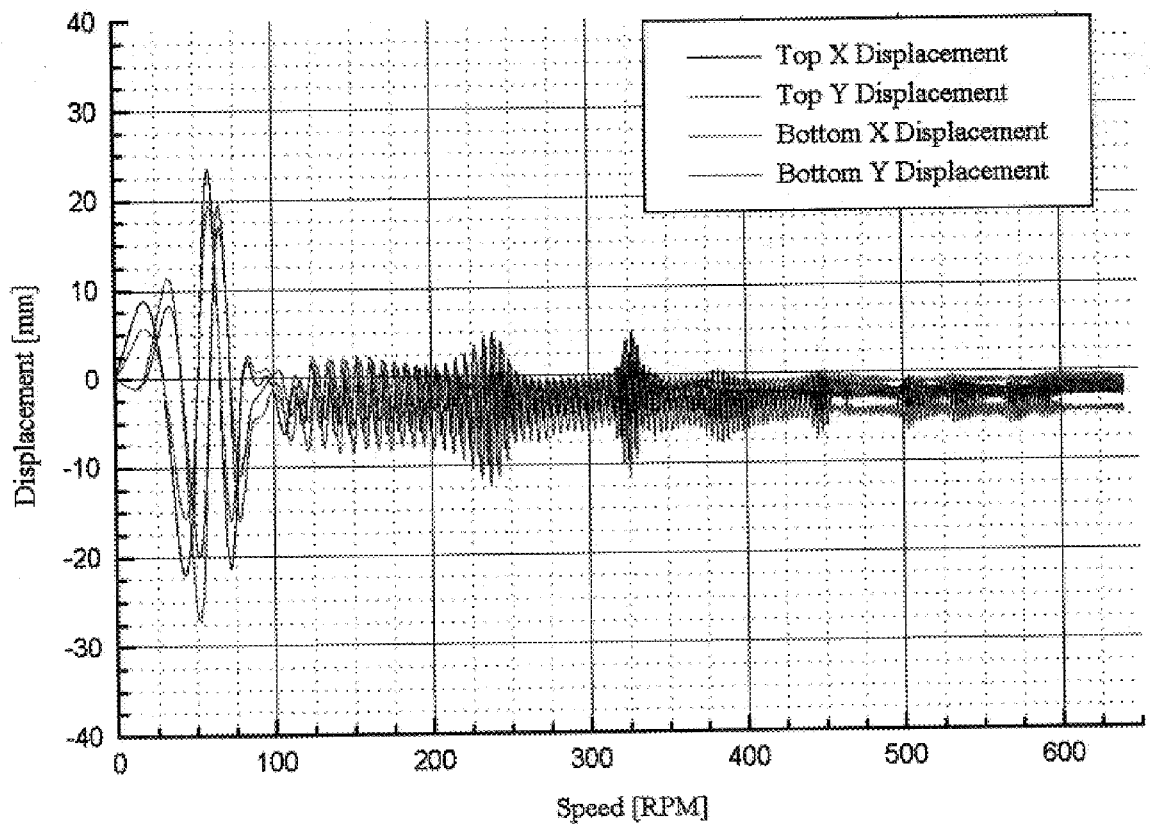
FIG. 12 is a graph of the displacement of a basket having a prior art balancing device at the bottom of the basket.
Figure 13:
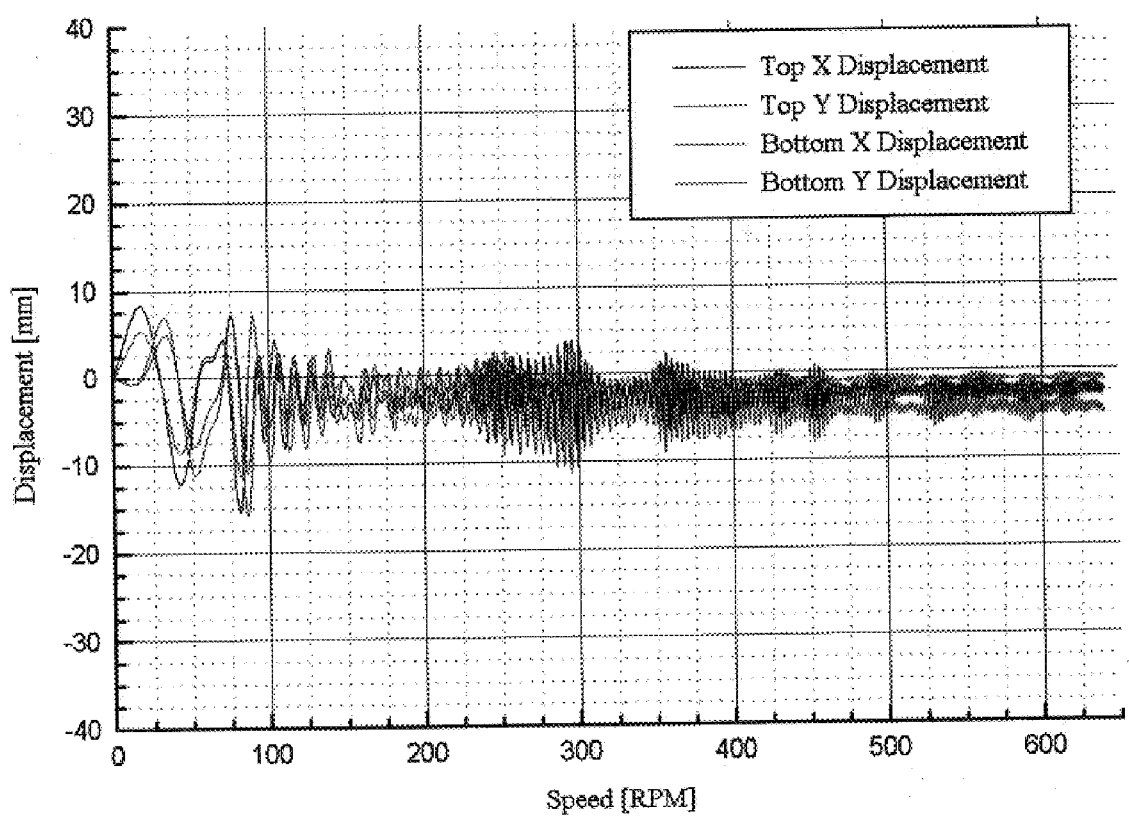
FIG. 13 is a graph of the displacement of a basket having balancing devices according to FIG. 1 at the top and bottom of the basket and with fluid with normal fluid viscosity.
Figure 14:
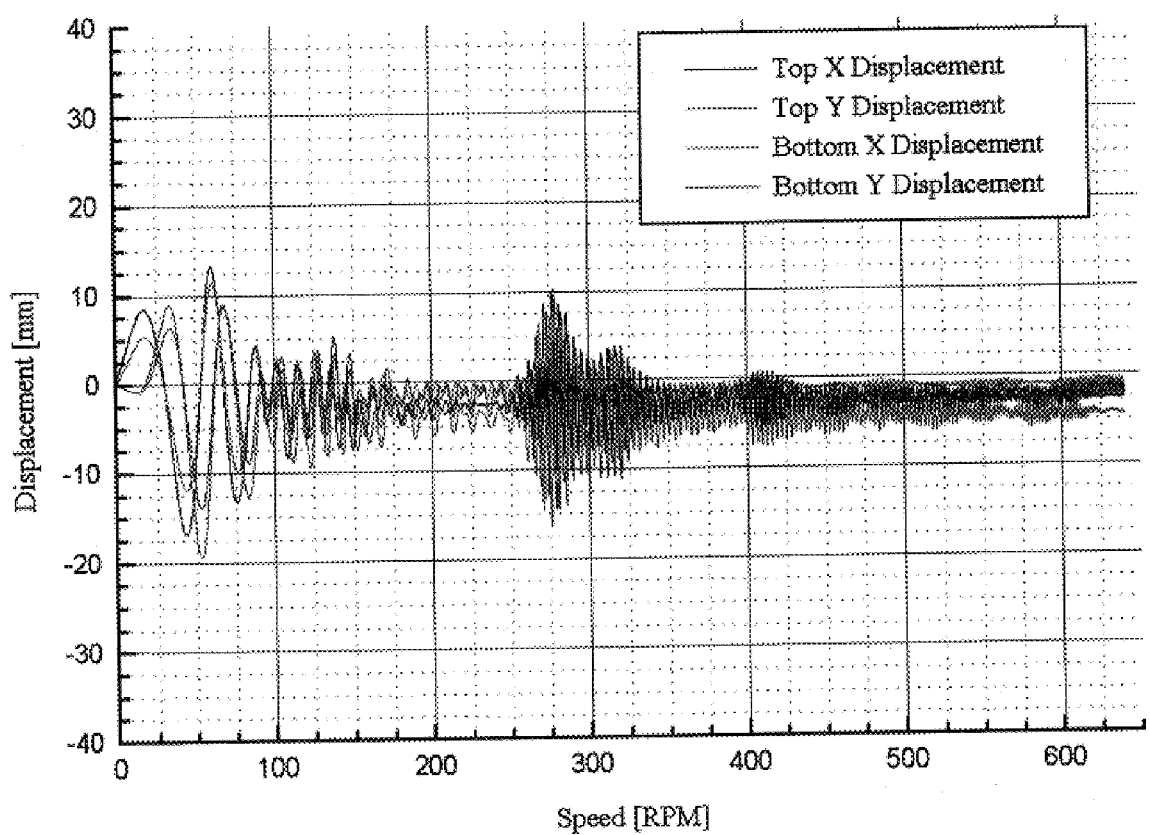
FIG. 14 is a graph of the displacement of a basket having balancing devices according to FIG. 1 at the top and bottom of the basket and with fluid having twice the normal fluid viscosity.
Figure 15:
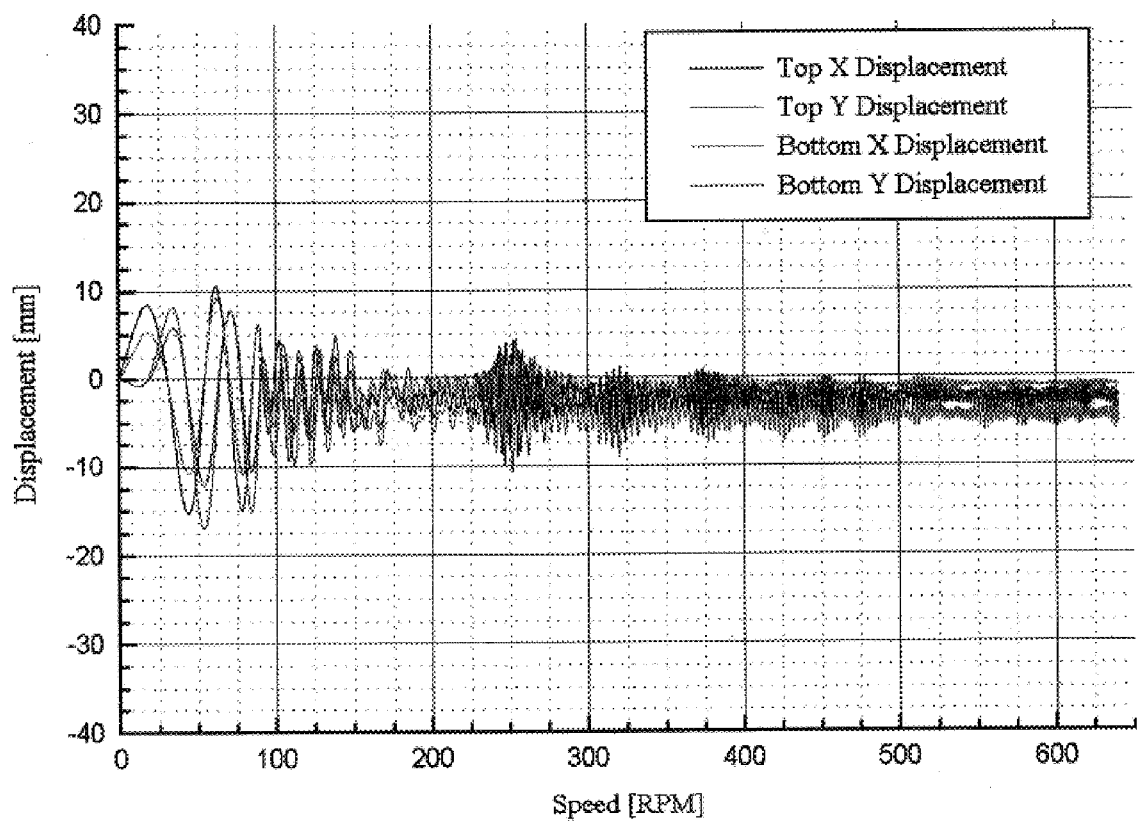
FIG. 15 is a graph of the displacement of a basket having balancing devices according to FIG. 1 at the top and bottom of the basket and with fluid having normal fluid viscosity in the top unit and fluid having twice the normal fluid viscosity in the bottom unit.
Figure 16:
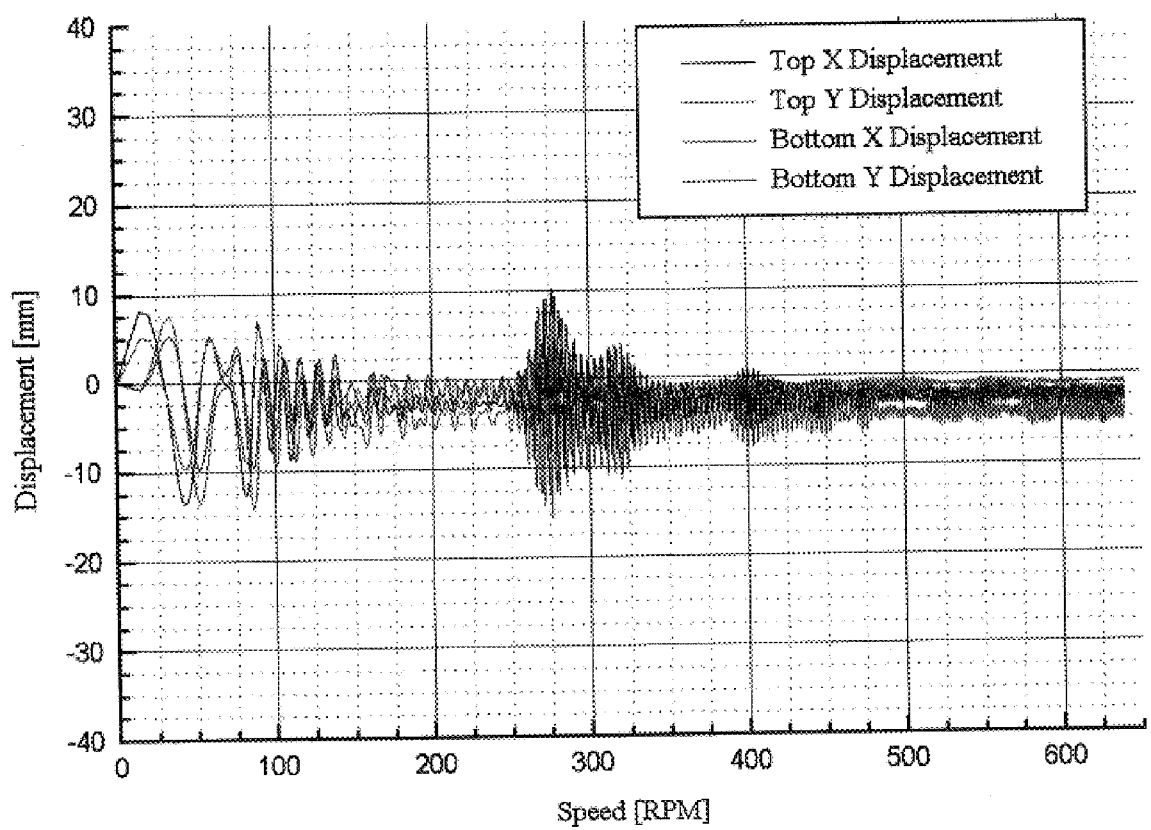
FIG. 16 is a graph of the displacement of a basket having balancing devices according to FIG. 1 at the top and bottom of the basket and with fluid having twice the normal fluid viscosity in the top unit and fluid having normal fluid viscosity in the bottom unit.

FIGS. 11–16 show a model of the displacement versus speed for baskets having different configurations of balancing devices positioned thereon. For each of the Figures, a top X and Y displacement and a bottom X and Y displacement are shown in different colors. FIG. 11 illustrates the displacement of a rotatable basket having fixed response top and bottom balancing devices of the prior art. FIG. 12 shows the displacement for a basket having a speed dependant top balancing unit according to the present invention and a bottom balancing device according to the prior art. As indicated in FIGS. 11 and 12, the displacement on start-up and the high speed vibration are substantially improved with the substitution of the speed dependent balancing device for the top balancing device of the prior art.

FIGS. 13–16 illustrate the displacements of a basket with the balancing device 20 according to FIG. 9 mounted on the basket. As can be clearly seen from the graphs, the present invention provides a substantial improvement in reducing start-up vibrations from about 30 to 35 mm with the prior art balancer to only about 8 to 25 mm for a basket with at least one of the speed dependant response control balancing devices 20 according to the invention.

Figure 17:
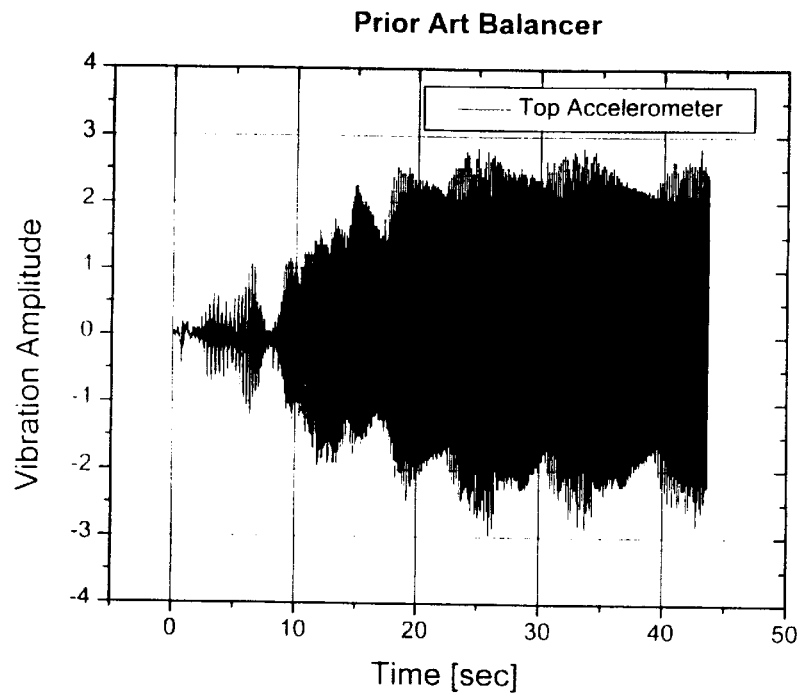
FIG. 17 is graph of vibration amplitude of a basket having prior art balancers mounted on the top and bottom of the basket with the vibration measured at a top of the basket.
Figure 18:
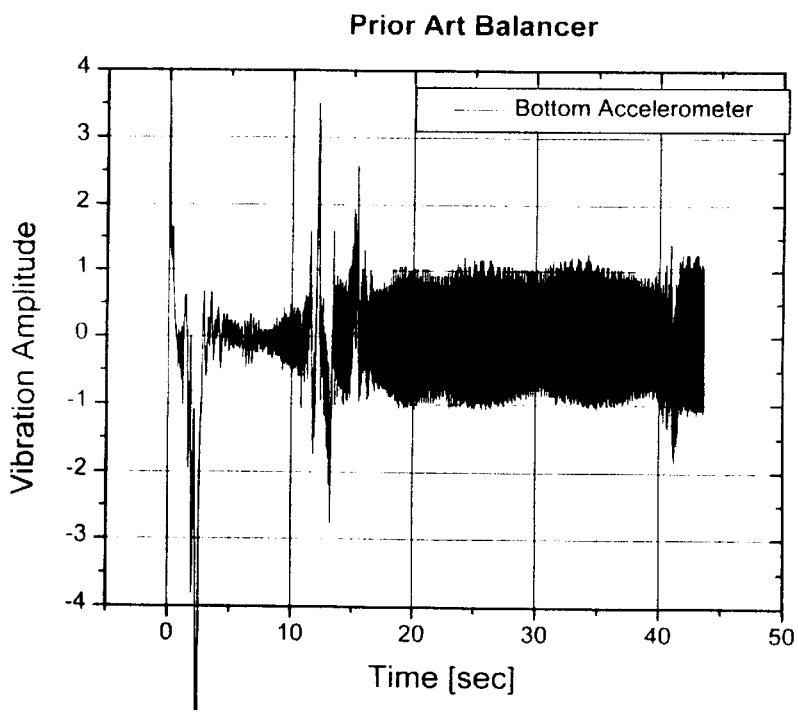
FIG. 18 is a graph of vibration amplitude of a basket having prior art balancers mounted on the top and bottom of the basket with the vibration measured at a bottom of the basket.
Figure 19:
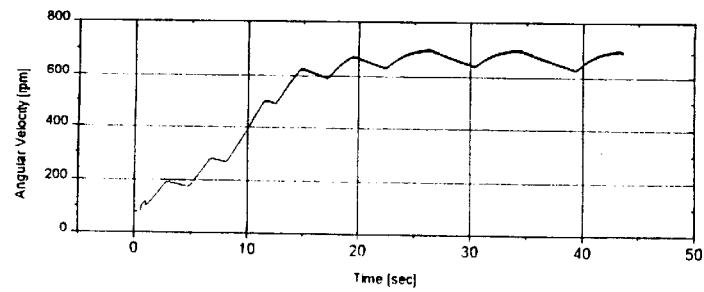
FIG. 19 is a graph of the angular velocity achieved during the tests illustrated in FIGS. 17 and 18.
Figure 20:
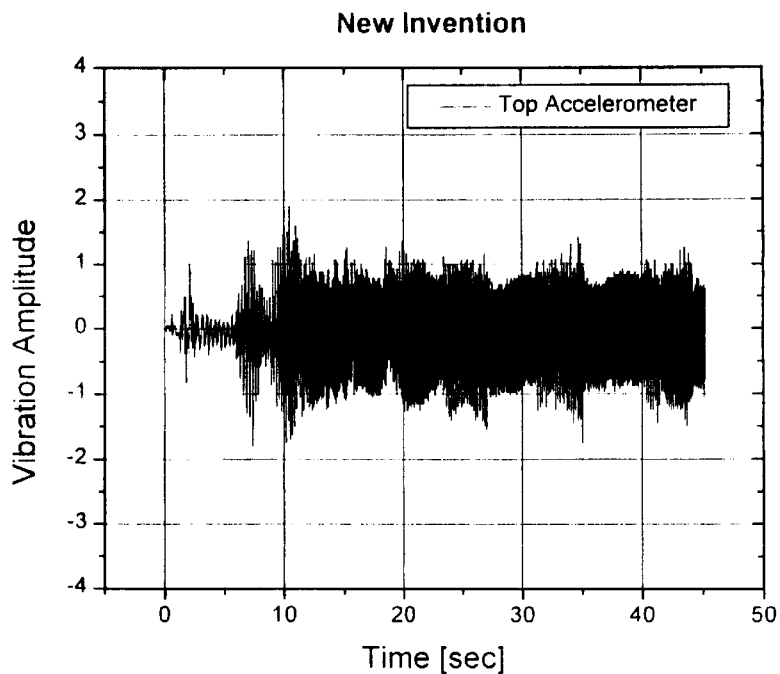
FIG. 20 is graph of vibration amplitude of a basket having balancers according to FIG. 9 mounted on the top and bottom of the basket with the vibration measured at the top of the basket.
Figure 21:
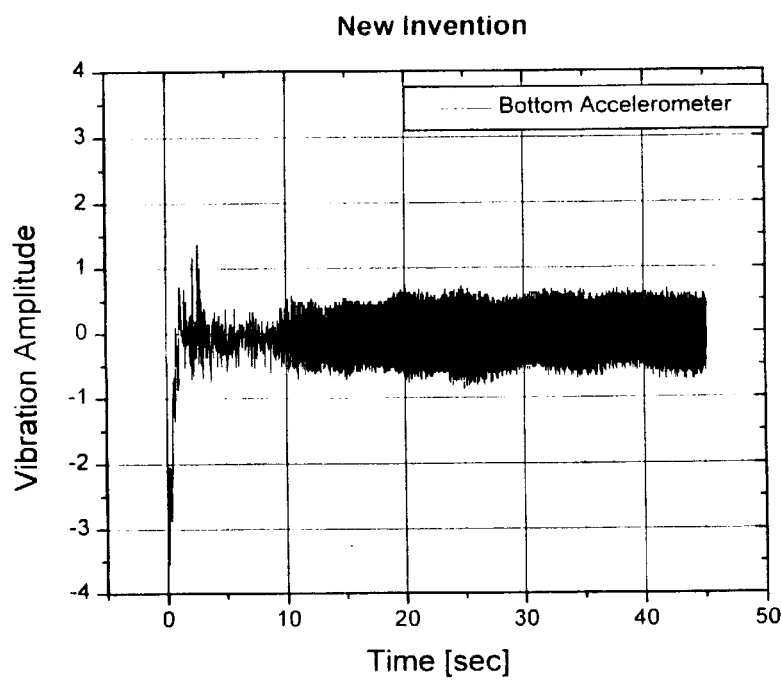
FIG. 21 is a graph of vibration amplitude of a basket having balancers according to FIG. 9 mounted on the top and bottom of the basket with the vibration measured at the bottom of the basket.
Figure 22:
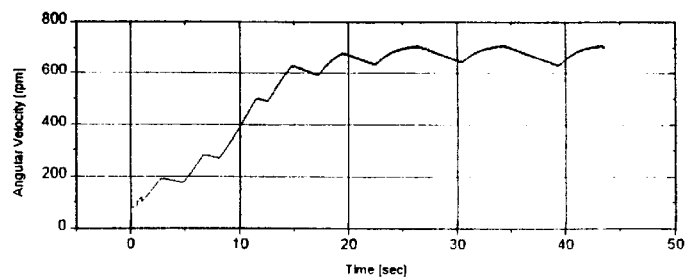
FIG. 22 is a graph of the angular velocity achieved during the tests illustrated in FIGS. 20 and 21.

FIGS. 17–22 show the actual results of a comparison test between the prior art balancer (FIGS. 17–19) and a speed dependant response control balancer (FIGS. 20–22). As can be seen by comparison of FIGS. 20 and 21 showing the operation of the invention with FIGS. 17 and 18 showing the prior art, the present invention provides a substantial improvement in vibration dampening. Both start-up and high speed vibrations are reduced by the present invention.

The speed dependant balancing device according to the present invention provides the advantage of smooth operation at any speed and significantly improved vibration damping over the prior art.

While the invention has been described in detail with reference to the preferred embodiments thereof, it will be apparent to one skilled in the art that various changes and modifications can be made and equivalents employed, without departing from the present invention.

What is claimed is:

1. A washing machine with a balancing device, the washing machine comprising:

a rotatable basket having an axis of rotation;

at least one circumferential passageway secured to the rotatable basket with an axis of rotation of the circumferential passageway coincident with the axis of rotation of the basket;

a reservoir containing a fluid;

a plurality of weights movable in the circumferential passageway;

a fluid connection between the reservoir and the circumferential passageway allowing fluid to pass between the reservoir and the circumferential passageway depending on the rotational speed of the basket, wherein the fluid connection is arranged such that the circumferential passageway contains a larger volume of the fluid at higher rotational speeds than at lower rotational speeds.

2. The washing machine of claim 1, wherein the fluid passes between the reservoir and the circumferential passageway to allow the plurality of weights to move freely when the rotatable basket rotates at a low speed and to prevent the weights from moving freely when the rotatable basket rotates at a higher speed.

3. A washing machine with a balancing device, the washing machine comprising:

a rotatable basket having an axis of rotation;

at least one circumferential passageway secured to the rotatable basket with an axis of rotation of the circumferential passageway coincident with the axis of rotation of the basket;

a reservoir containing a fluid;

a plurality of weights movable in the circumferential passageway;

a fluid connection between the reservoir and the circumferential passageway allowing fluid to pass between the reservoir and the circumferential passageway depending on the rotational speed of the basket, wherein the reservoir is an annular chamber having an inner wall and an outer wall, and the fluid connection between the reservoir and the circumferential passageway is located at the outer wall of the annular chamber.

4. The washing machine of claim 3, wherein the outer wall of the annular chamber is formed at an angle with respect to the axis of rotation of the basket.

5. The washing machine of claim 4, wherein the angle of the outer wall determines the speed at which the fluid will pass from the reservoir into the circumferential passageway.

6. The washing machine of claim 1, further comprising a second circumferential passageway containing a second plurality of weights, wherein the second circumferential passageway is separated from the at least one circumferential passageway.

7. The washing machine of claim 1, further comprising a second plurality of weights positioned movably in the liquid reservoir for additional balancing of the basket.

8. The washing machine of claim 1, wherein the movable weights are selected from the group consisting of balls, disks, and cylinders.

9. A speed dependant balancing device comprising:

at least one circumferential passageway;

a plurality of weights movable in the circumferential passageway;

a fluid within the circumferential passageway; and means for controlling a volume of the fluid in the circumferential passageway depending on a rotational speed of the balancing device, wherein the means for controlling a volume of fluid in the circumferential passageway includes a reservoir positioned radially inwardly from the at least one circumferential passageway and in fluid connection with the circumferential passageway.

10. The speed dependent balancing device of claim 9, wherein the means for controlling a volume of the fluid in the circumferential passageway allows the plurality of weights to move freely at low rational speeds and provides fluid damping of the weights preventing the weights from moving freely at higher rotational speeds.

11. A speed dependant balancing device for a washing machine comprising:

a circumferential path having a rotational axis which is coincident with a rotational axis of a washing machine basket;

a plurality of weights movable in the circumferential path; and a friction controlling means for controlling the speed of motion of the plurality of weights in the circumferential path depending on a rotational speed of the circumferential path and the washing machine basket, wherein the friction controlling means includes a reservoir positioned radially inwardly from the circumferential path and in fluid connection with the circumferential path.

12. The speed dependent balancing device of claim 11, wherein the friction controlling means allows the plurality of weights to move freely at low rotational speeds and provides fluid damping of the weights preventing the weights from moving freely at higher rotational speeds.

* * * * *